: (12) United States Patent
Kawasumi

(10) Patent No.: US 8,544,107 B2
(45) Date of Patent: Sep. 24, 2013

(54) INFORMATION PROCESSING SYSTEM, INFORMATION PROCESSING APPARATUS, AND COMPUTER-READABLE STORAGE MEDIUM

(75) Inventor: Kenji Kawasumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 93 days.

(21) Appl. No.: 13/180,257

(22) Filed: Jul. 11, 2011

(65) Prior Publication Data

US 2012/0023551 A1    Jan. 26, 2012

(30) Foreign Application Priority Data

Jul. 20, 2010    (JP) ................................ 2010-162467

(51) Int. Cl.
*H04L 29/06*    (2006.01)
(52) U.S. Cl.
USPC ........................................................ 726/27
(58) Field of Classification Search
None
See application file for complete search history.

(56) References Cited

U.S. PATENT DOCUMENTS

| 5,131,074 | A | * | 7/1992 | Nakamura et al. | ............... 706/52 |
| 7,716,109 | B1 |  | 5/2010 | Jacobs et al. | |
| 2006/0026692 | A1 | * | 2/2006 | Lakhani | .......................... 726/28 |
| 2009/0070599 | A1 | * | 3/2009 | Nishimura et al. | ............ 713/193 |

FOREIGN PATENT DOCUMENTS

| JP | 2001-060235 | 3/2001 |
| JP | 2004-185352 | 7/2004 |
| JP | 2010-074295 | 4/2010 |
| JP | 2010-218400 | 9/2010 |
| JP | 2011-129055 | 6/2011 |

* cited by examiner

*Primary Examiner* — Gilberto Barron, Jr.
*Assistant Examiner* — David Le
(74) *Attorney, Agent, or Firm* — IPUSA, PLLC

(57) ABSTRACT

An information processing system includes an external system having an external server managing public information, and an internal system having an internal server managing secure information and a terminal outputting information. The external server sends an information generating module to the terminal at an acquisition request source, and the terminal executes the received information generating module, in order to generate information to be provided, using the public information acquired from the external server and the secure information acquired from the internal sever.

16 Claims, 9 Drawing Sheets

| |
|---|
| (ACCESS DESTINATION DATA TO INTERNAL INFORMATION) |
| (DATA FORMAT OF INTERNAL INFORMATION) |
| (ACCESS AUTHENTICATION DATA TO INTERNAL INFORMATION) |
| (ACCESS DESTINATION CONVERSION DATA TO INTERNAL INFORMATION) |
| .... |

INFORMATION PROCESSING SYSTEM, INFORMATION PROCESSING APPARATUS, AND COMPUTER-READABLE STORAGE MEDIUM

CROSS-REFERENCE TO RELATED APPLICATIONS

This application claims the benefit of a Japanese Patent Application No. 2010-162467 filed on Jul. 20, 2010, in the Japanese Patent Office, the disclosure of which is hereby incorporated by reference.

BACKGROUND OF THE INVENTION

1. Field of the Invention

The present invention relates to an information processing apparatus connected to an external network, and an information processing system in which information processing apparatuses connected to an internal network perform an interaction or a linked operation. The present invention also relates to a non-transitory computer-readable storage medium that stores a program which, when executed by a computer, causes the computer to perform a process of the information processing apparatus or the information processing system. The present invention further relates to an information processing method to be implemented in the information processing apparatus or the information processing system.

2. Description of the Related Art

Recently, in an environment (user environment) in which an image processing apparatus is introduced, a manufacturer of the image processing apparatus provides a service (for example, a MPS (Managed Print Service)) to support operation and management of equipments that are introduced, via an external network (for example, a WAN (Wide Area Network)) such as the Internet.

According to the above service, external information (for example, public information such as "equipment name" and "model name") managed in a manufacturer environment in the external network and internal information (for example, secure information such as "utilization log") are merged, to provide information that is related to the equipment operation and management and is useful to the user. In this case, the internal information that is managed by an internal server set up within the user environment is once collected via the external network by the an external server set up within the manufacturer environment. The internal information is merged with the external information and provided to the user when there is a request to provide the information.

However, unlike the external information that is public information, the internal information is secure information. For this reason, an authentication process may be required when an access is made from the external server to the internal server or, an enciphered communication (for example, SSL (Secure Sockets Layer)) may be required when a communication is made between the external server and the internal server, in order to acquire the internal information.

For example, a Japanese Laid-Open Patent Publication No. 2001-60235 proposes a method of performing a secure financial transaction that uses a VPN (Virtual Private Network), an enciphered communication, an authentication process, and the like in order to improve the security of transaction exchanged via the network.

However, according to the conventional method, it is a precondition that the external server collects and manages the internal information, regardless of the security technology used. As a result, the internal information that is secure information is exchanged via the external network, and thus, there is a risk of information leak via the external network.

For the above security reasons, some users have decided not to use the above service that supports operation and management of equipments that are introduced.

SUMMARY OF THE INVENTION

Accordingly, it is a general object in one embodiment of the present invention to provide a novel and useful information processing system, information processing apparatus, information processing method, and non-transitory computer-readable storage medium, in which the problem described above may be suppressed.

Another and more specific object in one embodiment of the present invention is to provide an information processing system, an information processing apparatus, an information processing method, and a non-transitory computer-readable storage medium, that may provide security of internal information in a user environment and provide information using external information and the internal information.

According to one aspect of the present invention, there is provided an information processing system comprising an external system comprising a first information processing apparatus configured to manage public external information retained in a first storage region, and provide a software service; and an internal system, coupled to the external system via a data channel, and comprising a second information processing apparatus configured to manage secure internal information retained in a second storage region, and a third information processing apparatus configured to output information to be provided by the software service, wherein the first information processing apparatus comprises an information generating function providing part configured to send to an acquisition request source an information generating module for generating the information to be provided, and provide an information generating function, and wherein the third information processing apparatus comprises an information generating function acquiring part configured to receive the information generating module and acquire the information generating function; and an information generating part configured to generate the information to be provided, by executing the information generating module, using the external information acquired from the first information processing apparatus and the internal information acquired from the second information processing apparatus.

According to another aspect of the present invention, there is provided an information processing system comprising an external system comprising a first information processing apparatus configured to manage public external information retained in a first storage region, and provide a software service; and an internal system, coupled to the external system via a data channel, and comprising a second information processing apparatus configured to manage secure internal information retained in a second storage region and output information to be provided by the software service, wherein the first information processing apparatus comprises an information generating function providing part configured to send to an acquisition request source an information generating module for generating the information to be provided, and provide an information generating function, and wherein the second information processing apparatus comprises an information generating function acquiring part configured to receive the information generating module and acquire the information generating function; and an information generating part configured to generate the information to be provided, by executing the information generating module, using the external information acquired from the first information processing apparatus and the internal information acquired from the second information processing apparatus.

According to still another aspect of the present invention, there is provided an information processing apparatus comprising a managing part configured to manage public external information retained in a first storage region, to provide a software service; and an information generating function providing part configured to provide an information generating function, wherein the information processing apparatus is coupled via a data channel to an internal system comprising a first information processing apparatus configured to manage secure internal information retained in a second storage region, and a second information processing apparatus configured to output information to be provided by the software service, and wherein the information generating function providing part sends to the second information processing apparatus an information generating module for generating the information to be provided, using the external information acquired from the second information processing apparatus and the internal information acquired from the first information processing apparatus, in response to an acquisition request from the second information processing apparatus.

According to a further aspect of the present invention, there is provided an information processing apparatus comprising a managing part configured to manage public external information retained in a first storage region, to provide a software service; and an information generating function providing part configured to provide an information generating function, wherein the information processing apparatus is coupled via a data channel to an internal system comprising another information processing apparatus configured to manage secure internal information retained in a second storage region and output information to be provided by the software service, and wherein the information generating function providing part sends to the other information processing apparatus an information processing module for generating the information to be provided, using the external information managed in the information processing apparatus and the internal information managed in the other information processing apparatus, in response to an acquisition request from the other information processing apparatus.

According to another aspect of the present invention, there is provided a non-transitory computer-readable storage medium which stores a program which, when executed by a computer, causes the computer to perform a process in an information processing system, wherein the information processing system comprises an external system including a first information processing apparatus configured to manage public external information retained in a first storage region, and provide a software service, and an internal system, coupled to the external system via a data channel, and including a second information processing apparatus configured to manage secure internal information retained in a second storage region, and a third information processing apparatus configured to output information to be provided by the software service, wherein the process comprises a procedure causing the first information processing apparatus to function as an information generating function providing part configured to send to an acquisition request source an information generating module for generating the information to be provided, and provide an information generating function; and a procedure causing the third information processing apparatus to function as an information generating function acquiring part configured to receive the information generating module and acquire the information generating function; and a procedure causing the third information processing apparatus to function as an information generating part configured to generate the information to be provided, by executing the information generating module, using the external information acquired from the first information processing apparatus and the internal information acquired from the second information processing apparatus.

According to still another aspect of the present invention, there is provided a non-transitory computer-readable storage medium which stores a program which, when executed by a computer, causes the computer to perform a process in an information processing system, wherein the information processing system comprises an external system comprising a first information processing apparatus configured to manage public external information retained in a first storage region, and provide a software service, and an internal system, coupled to the external system via a data channel, and comprising a second information processing apparatus configured to manage secure internal information retained in a second storage region and output information to be provided by the software service, wherein the process comprises a procedure causing the first information processing apparatus to function as an information generating function providing part configured to send to an acquisition request source an information generating module for generating the information to be provided, and provide an information generating function; a procedure causing the second information processing apparatus to function as an information generating function acquiring part configured to receive the information generating module and acquire the information generating function; and a procedure causing the second information processing apparatus to function as an information generating part configured to generate the information to be provided, by executing the information generating module, using the external information acquired from the first information processing apparatus and the internal information acquired from the second information processing apparatus.

Other objects and further features of the present invention will be apparent from the following detailed description when read in conjunction with the accompanying drawings.

BRIEF DESCRIPTION OF THE DRAWINGS

FIG. 4 is a diagram illustrating an example of data of access setting information in the first embodiment of the present invention;

DESCRIPTION OF THE PREFERRED EMBODIMENTS

Figure 1:
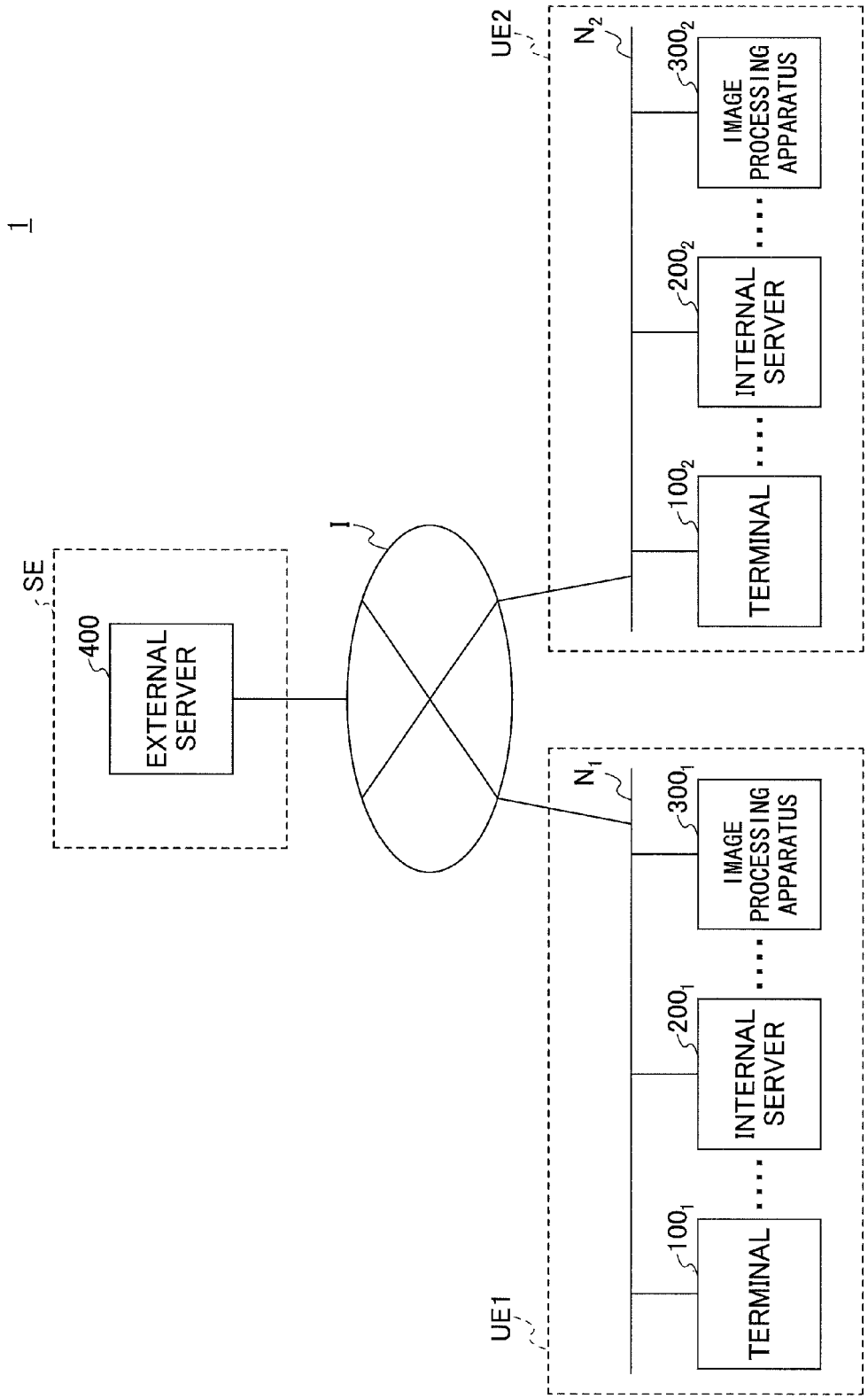
FIG. 1 is a block diagram illustrating an example of a structure of an information processing system in a first embodiment of the present invention.

A description will be given of an information processing system, an information processing apparatus, an information processing method, and a non-transitory computer-readable storage medium in embodiments of the present invention, by referring to the drawings.

First Embodiment

System Structure

FIG. 1 is a block diagram illustrating an example of a structure of an information processing system in a first embodiment of the present invention. As illustrated in FIG. 1, an information processing system 1 in this embodiment includes a manufacturer environment (hereinafter referred to an "external service providing environment") SE that provides various software services, and one or a plurality of user environments UE1 and UE2 in which equipments are introduced (hereinafter also referred to by a generally given name "user environment UE"), that are connected via an external network I such as the Internet.

The information processing system 1 having the structure described above may provide various software services in a SaaS (Software as a Service) format. The SaaS format refers to a software distribution format that distributes to the user only a software function required by the user, in the form of a service. The software function distributed by the Saas format is also referred to as service type software.

In the external service providing environment SE, an external server 400 is connected to the external network I. The external server 400 is formed by an information processing apparatus, such as a PC (Personal Computer), and includes software for realizing a function to manage public information (hereinafter referred to as "external information").

The user environment UE includes one or a plurality of terminals $100_1$ and $100_2$ (hereinafter also referred to by a generally given name "terminal 100"), internal servers $200_1$ and $200_2$ (hereinafter also referred to by a generally given name "internal server 200"), and image processing apparatuses $300_1$ and $300_2$ (hereinafter also referred to by a generally given name "image processing apparatus 300") that are connected via internal networks N1 and N2 (hereinafter also referred to by a generally given name "internal network N") such as a LAN (Local Area Network).

The terminal 100 is formed by an information processing apparatus that may download (or acquire) predetermined software from the external server 400, and utilizes various software services. The internal server 200 is formed by an information processing apparatus that includes software for realizing a function to manage secure information (hereinafter referred to as "internal information"). The image processing apparatus 300 may be formed by an equipment provided with hardware for realizing an image processing function, such as a MFP (Multi-Function Peripheral), for example.

The user environment UE includes the internal network N that is connected to the external network I, and may perform a data communication with the external service providing environment SE. In other words, in the information processing system 1 in this embodiment, the terminal 100 may perform a data communication with the external server 400 via the external network I.

The above described system structure of the information processing system 1 in this embodiment may provide information processing services by an interaction or a linked operation of equipments having a communicating function (or communication unit or means).

In this embodiment, it is assumed for the sake of convenience that the user environment UE and the external service providing environment SE are connected to the external network I via a FW (Fire Wall, not illustrated) for security reasons.

<Hardware Structure>

Next, a description will be given of hardware structures of the terminal 100, the internal server 200, and the external server 400 in this embodiment. An information processing apparatus that forms the terminal 100 will be described as an example.

Figure 2:
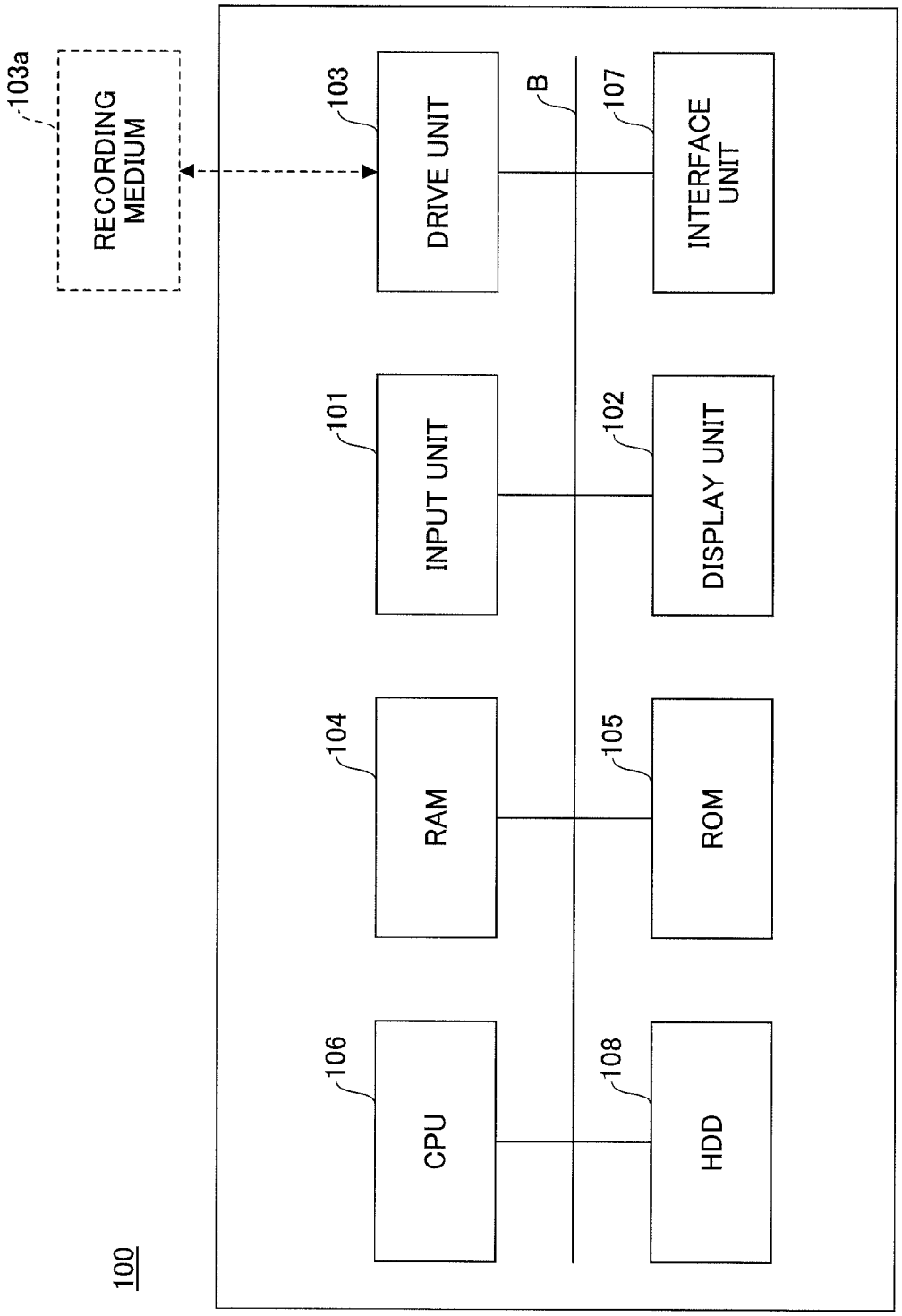
FIG. 2 is a block diagram illustrating a hardware structure of an information processing apparatus in the first embodiment of the present invention.

FIG. 2 is a block diagram illustrating a hardware structure of the information processing apparatus in the first embodiment of the present invention. An information processing apparatus 100 illustrated in FIG. 2 includes an input unit 101, a display unit 102, a drive unit 103, a RAM (Random Access Memory) 104, a ROM (Read Only Memory) 105, a CPU (Central Processing Unit) 106, an interface unit 107, and a HDD (Hard Disk Drive) 108 that are connected via a bus B.

The input unit 101 may include a keyboard, a mouse, and the like, and used to input various operation signals and the like to the information processing apparatus 100. The display unit 102 may include a LCD (Liquid Crystal Display) and the like, and used to display results of processing performed by the information processing apparatus 100 and the like.

The interface unit 107 connects the information processing apparatus 100 to a data channel (for example, the "internal network"). Hence, the information processing apparatus 100 may perform a data communication via the interface unit 107 with the equipments (for example, the "internal server", "image processing apparatus", and "external server") having the communicating function (or communication unit or means).

The HDD 108 forms a non-volatile storage unit to store programs and data. The programs and data stored in the HDD 108 may include basic software (for example, an OS (Operating System) of "Windows (registered trademark)", "UNIX (registered trademark)", and the like) that controls the entire information processing apparatus 100, and application software for realizing various functions. In addition, the programs and data stored in the HDD 108 may be managed in the form of a predetermined file system and/or a DB (Data-Base).

The drive unit 103 provides an interface between the information processing apparatus 100 and a recording medium 103a that is detachable with respect to the drive unit 103. Hence, the information processing apparatus 100 may write information to and/or read information from the recording medium 103a via the drive unit 103. For example, the recording medium 103a may be formed by a floppy disk (registered trademark), a CD (Compact disk), a DVD (Digital Versatile Disk), a SD (Secure Digital) memory card, a USB (Universal Serial Bus) memory, and the like.

The ROM 105 may be formed by a non-volatile semiconductor memory (or storage unit) to retain internal data even when the power of the information processing apparatus 100 is turned OFF. The ROM 105 may store a BIOS (Basic Input/Output System) that is executed when the information processing apparatus 100 is started (or booted), and programs and data for making settings of the information processing system and the settings of the network. The RAM 104 may be formed by a volatile semiconductor memory (or storage unit) to temporarily retain programs and data. The CPU 106 reads the programs and data from the storage unit (for example, the "HDD" and the "ROM") and stores the programs and data in the RAM 104, in order to execute a process to control the entire information processing apparatus 100 and to realize various installed functions of the information processing apparatus 100. Any suitable non-transitory computer-readable storage medium, including the storage unit described above, may store a program which, when executed by a computer (or "CPU"), causes the computer to perform the process of the information processing apparatus 100.

The above described hardware structure of the information processing apparatus 100 in this embodiment may provide the information processing services.

<Information Processing Function>

Next, a description will be given of the information processing function of this embodiment.

In the information processing system 1 in this embodiment, the terminal 100 connected to the internal network N downloads (or acquires) from the external server 400 (information processing apparatus connected to the external network) a module for generating information to be provided (software for realizing an information generating function), and executes the acquired module. As a result, the following information generating process is performed in the terminal 100. That is, the terminal 100 makes an access to the internal server 200 (information processing apparatus connected to the internal network) that retains the internal information, based on access setting information of the internal information, and acquires the internal information. Then, the terminal 100 makes an access to the external server 400 that retains the external information, and acquires the external information. The terminal 100 merges (or combines) the acquired external information and the acquired internal information according to a predetermined data format, and generates the information to be provided. The information processing system 1 in this embodiment includes the information processing function described above.

Conventionally, it is a precondition that an external server corresponding to the external server 400 collects and manages the internal information. For this reason, the internal information that is secure information is actually exchanged via the external network, and thus, there is a risk of information leak via the external network.

On the other hand, the information processing system 1 in this embodiment downloads (or acquires) from the external server 400 the module for generating the information to be provided by merging the external information and the internal information, and executes this module in the user environment UE, so that the generation of the information to be provided, including the internal information, occurs only within the user environment UE. In other words, in the information processing system 1 in this embodiment, the external server 400 does not collect the internal information of the user environment UE.

Accordingly, the information processing system 1 in this embodiment may maintain security of the internal information in the user environment UE, and output the information to be provided using the external information and the internal information.

Figure 3:
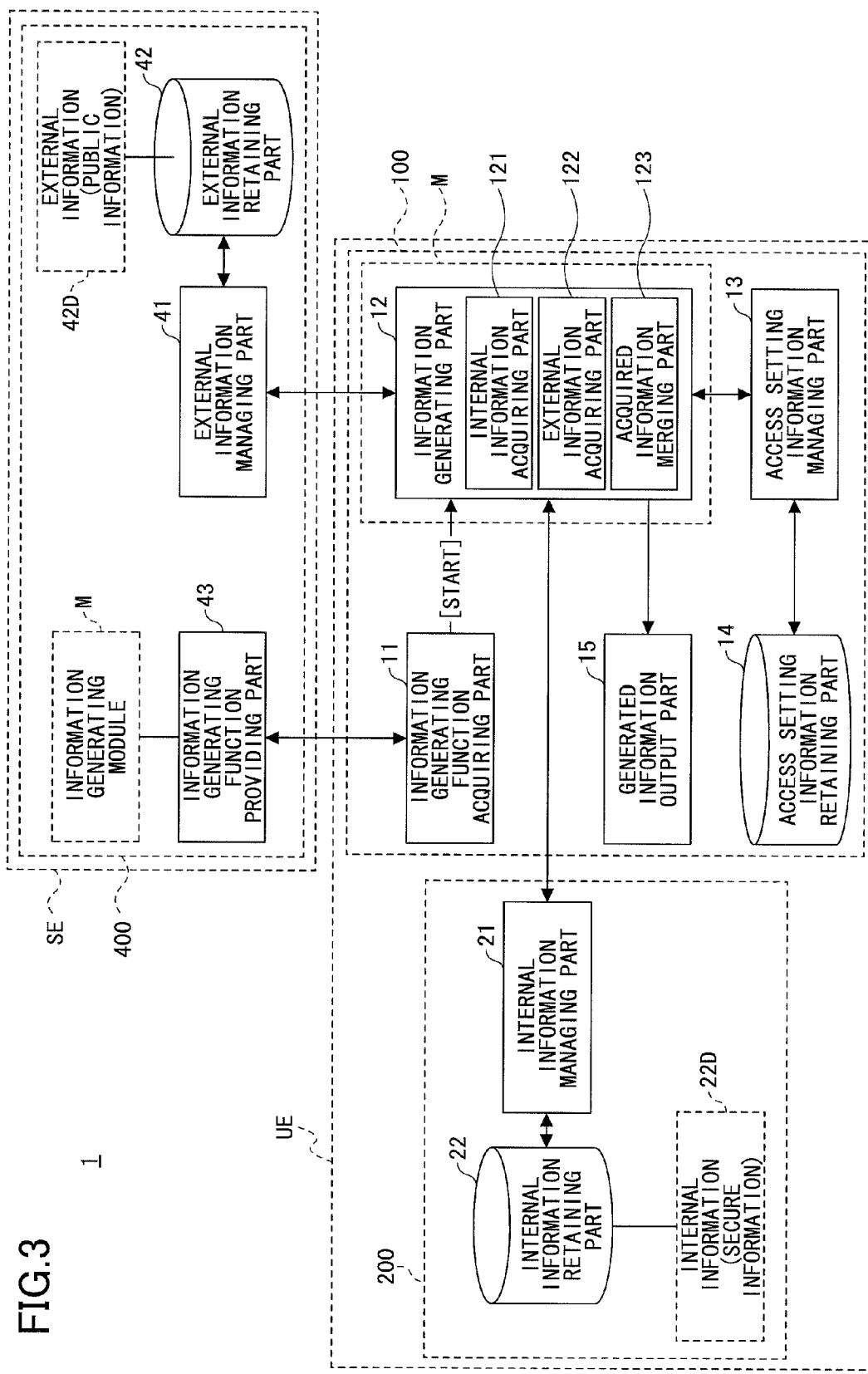
FIG. 3 is a block diagram illustrating an example of a functional structure of the information processing system in the first embodiment of the present invention.

Next, a description will be given of the structure and the operation of the information processing function of this embodiment, by referring to FIG. 3. FIG. 3 is a block diagram illustrating an example of a functional structure of the information processing system in the first embodiment of the present invention.

As illustrated in FIG. 3, the information processing system 1 in this embodiment includes an information generating function acquiring part 11, an information generating part 12, an access setting information managing part 13, a generated information output part 15, an internal information managing part 21, an external information managing part 41, and an information generating function providing part 43.

The information generating function acquiring part 11, the information generating part 12, the access setting information managing part 13, and the generated information output part 15 are function parts of the terminal 100. The internal information managing part 21 is a function part of the internal server 200. These function parts of the terminal 100 and the internal server 200 function in the user environment UE. On the other hand, the external information managing part 41 and the information generating function providing part 43 are function parts of the external server 400, and these function parts of the external server 400 function in the external service providing environment SE.

A description will hereinafter be given of the function parts of each of the internal server 200, the external server 400, and the terminal 100, in this order.

<<Functions of Internal Server>>

The internal information managing part 21 performs a predetermined data operation in response to a request, and manages internal information 22D (secure information) to be retained in the user environment UE. The predetermined data operation may include a data registration (or addition), a modification (or update), a deletion (or erasure), a reference (search and specify), an acquisition, and the like. The internal information managing part 21 makes an access to the internal information retaining part 22 that retains the internal information 22D, and performs the requested data operation, in order to perform information management.

For example, the internal information retaining part 22 may be formed by a predetermined storage region of the storage unit (for example, "HDD") in the internal server 200. For example, the internal information 22D retained in the internal information retaining part 22 includes utilization information (or utilization log) related to the image processing apparatus 300 (equipment of contract) introduced to the user environment UE, that is, secure information. The internal information 22D may be updated by the internal information managing part 21 in the following manner. First, the internal information managing part 21 periodically collects the utilization information (or performs a polling process to acquire information) from the image processing apparatus 300 that is connected to the internal server 200 via the internal network N. Then, the internal information managing part 21 makes an access to the internal information retaining part 22, and updates item values of corresponding items based on the collected utilization information.

<<Function of External Server>>

The external information managing part 41 performs a predetermined data operation in response to a request, and manages external information 42D (public information) retained in the external service providing environment SE. The predetermined data operation performed by the external information managing part 41 may be the same as the predetermined data operation performed by the internal information managing part 21. The external information managing part 41 makes an access to the external information retaining part 42 that retains the external information 42D, and performs the requested data operation, in order to perform information management.

For example, the external information retaining part 42 may be formed by a predetermined storage region of the storage unit (for example, "HDD") in the external server 400. For example, the external information 42D retained in the external information retaining part 42 includes equipment information (for example, "equipment name" and "model name") related to the image processing apparatus 300 (equipment of contract) introduced in the user environment UE, that is, public information. The external information 42D may be registered by the external information managing part 41 in the following manner. That is, the external information managing part 41 provides a predetermined GUI (Graphical User Interface), accepts contract information of the user, and makes an access to the external information retaining part 42, in order to register the item values of the corresponding items based on the accepted contract information.

The information generating function providing part 43 provides an information generating function with respect to the user environment UE in response to a request. More particularly, when the information generating function providing part 43 accepts the request for the information providing function from the terminal 100 in the user environment UE, in the external server 400, the information generating function providing part 43 provides (or uploads) the software for realizing the information generating function, according to the accepted request. The "software" in this case corresponds to a module (hereinafter referred to as an "information generating module") M for generating the information to be provided by merging the external information 42D and the internal information 22D. This module M is stored in a predetermined storage region of the storage unit in the external server 400.

In addition, the information generating function providing part 43 judges whether the user environment UE, that is a request destination, is a registered environment that is permitted as a providing destination for the information generating module M, based on the contract information of the user. In a case in which the request is from the permitted registered environment, the information generating function providing part 43 provides the information generating module M.

<<Function of Terminal>>

The information generating function acquiring part 11 acquires an information generating function from the external service providing environment SE in response to a request. More particularly, the information generating function acquiring part 11 requests the information generating function to be provided, from the terminal 100 of the user environment UE with respect to the external server 400, via the external network I, in order to acquire (or download) the software for realizing the requested information generating function. In other words, the information generating function acquiring part 11 acquires the information generating module M from the external server 400. For example, the information generating function acquiring part 11 may be realized by use of an information acquiring function of a browser or the like. That is, the information generating module M may be acquired by issuing a predetermined command with respect to the external server 400 from the browser that operates in the terminal 100.

The information generating part 12 generates the information to be provided, by merging the external information 42D and the internal information 22D. For example, the information generating part 12 may be realized by use of the information processing function of the browser or the like. More particularly, the acquired information generating module M may be executed in the browser. In other words, the function of the information generating part 12 may be realized by executing the information generating module acquired by the information generating function acquiring part 11.

The information generating part 12 includes an internal information acquiring part 121, an external information acquiring part 122, and an acquired information merging part 123, and generates the information to be provided in the following manner.

The information generating part 12 requests acquisition of the internal information 22D with respect to the internal information managing part 21 of the internal server 200, from the internal information acquiring part 121, in order to acquire the internal information 22D. In this state, the internal information acquiring part 121 requests acquisition of information (that is, makes an information acquisition request), based on the access setting information of the internal information 22D.

Next, a description will be given of the access setting information, by referring to FIG. 4. FIG. 4 is a diagram illustrating an example of data of the access setting information in the first embodiment of the present invention.

As illustrated in FIG. 4, the access setting related to the internal information 22D is defined in access setting information 14D. FIG. 4 illustrates information items that include access destination data to the internal information 22D, data format of the internal information 22D, access authentication data to the internal information 22D, and access destination conversion data to the internal information 22D.

The item "access destination data" indicates the storage region that retains the internal information 22D, and for example, the item value thereof may be a URL (Uniform Resource Locator) to the internal information retaining part 22 or the internal server 200. The item "data format" indicates the data format with which the internal information 22D is to be managed. For example, the item value of the item "data format" may be a DB type (MySQL (registered trademark)) or "OracleSQL (registered trademark)) that manages the internal data 22D.

The item "access authentication data" indicates authentication information to be used when making the access to the internal information 22D. For example, the item value of the item "access authentication data" may be a user ID or a user password that permits the access to the internal information 22D. In addition, the item "access destination conversion data" indicates the conversion of the acquisition method based on the internal information (target internal information to be acquired) 22D. For example, the item value of the item "access destination conversion data" may be a value (information specifying storage destination or location where the internal information is retained) that specifies a table or column of the DB that manages the internal information 22D. For example, suppose that the internal information 22D to be acquired is "A", and that "A" is retained in a column "C" of a table "B" within the DB that manages the internal information 22D. In this case, in order to acquire "A" from the DB, it is necessary to specify the column "C" of the table "B". Hence, the internal information 22D of the acquisition target and the storage destination specifying information indicating the destination or location where the internal information 22D (acquisition target) is retained, are set (or defined) in correspondence with each other in the item "access destination conversion data".

The access setting information 14D described above is managed by the access setting information managing part 13. The access setting information managing part 13 performs a predetermined data operation in response to a request, in order to manage the access setting information 14D to be retained in the user environment UE. The predetermined data operation performed by the access setting information managing part 13 may be the same as the predetermined data operation performed by the internal information managing part 21. The access setting information managing part 13 makes an access to the access setting information retaining part 14 that retains the access setting information 14D, and performs the requested data operation, in order to perform information management.

For example, the access setting information retaining part 14 may be formed by a predetermined storage region of the storage unit (for example, "HDD") in the terminal 100. The access setting information 14D may be set and registered by the access setting information managing part 13 in the following manner. That is, the access setting information managing part 13 may provide a predetermined GUI, accept management information (each item setting of "access destination", "data format", "access authentication", and "access destination conversion") of the user environment UE, and make an access to the access setting information retaining part 14, in order to set and register the item values of the corresponding items based on the accepted management information.

Returning now to the description of FIG. 3, the information generating part 12 makes an acquisition request to acquire the access setting information 13D with respect to the access setting information managing part 13, and acquires the access setting information 14D from the access setting information retaining part 14. Hence, the internal information acquiring part 121 makes an access to the internal server 200 (or internal information retaining part) based on the item value of the item "access destination data" in the acquired access setting information 14D, and makes an acquisition request to acquire the internal information 22D with respect to the internal information managing part 21 in the internal server 200.

As a result, the internal information managing part 21 makes a judgement to determine whether to permit access to the internal information 22D, based on the item value of the item "access authentication data" of the access setting information 14D. Then, the internal information managing part 21 performs a data acquisition operation with respect to the internal information 22D to which the access is permitted as a result of the judgement, based on the item values of the item "data format" and the item "access destination conversion data" of the access setting information 14D.

Accordingly, the internal information acquiring part 121 acquires the requested internal information 22D from the internal information managing part 21 in response to the acquisition request. The internal information managing part 21 sends to the internal information acquiring part 121 at the request source, in response to the acquisition request, only the information (corresponding information: actual value) to which the access was permitted and was acquirable from the internal information retaining part 22 by the conversion of the acquisition method, amongst the internal information 22D which was requested by the acquisition request. Hence, the internal information acquiring part 121 acquires only the internal information 22D which is accessible and to which the data operation may be performed, based on the access setting information 14D.

Next, the information generating part 12 makes an acquisition request to acquire the external information 42D with respect to the external information managing part 42 in the external server 400, from the external information acquiring part 122, and acquires the external information 42D. In this state, the external information acquiring part 122 requests acquisition of information (that is, makes an information acquisition request), based on the access setting information of the external information 42D.

The access setting information of the external information 42D may be acquired by the function of the information generating module M that is acquired from the external server 400 by the external information acquiring part 122. Thus, the access setting information of the external information 42D is set in advance (or preset) within the information generating module M. In addition, the access setting information of the external information 42D merely needs to include the item "access destination data". This is because, the data format and the specifying of the storage destination of the external information retaining part 42 (or DB) that manages the external information 42D may be determined in advance depending on the user environment UE that is the source of the information acquisition request. Furthermore, with regard to the access authentication, the access to the external information 42D is permitted at the point in time when the information generating module M is acquired from the external server 400.

The external information acquiring part 122 makes an access to the external server 400 (or external information retaining part), based on the item value of the item "access destination data" in the access setting information of the external information 42D that is set in advance in the information generating module M, and requests acquisition of the external information 42D with respect to the external information managing part 41 in the external server 400. In this state, the external information acquiring part 122 sends to the external server 400 information (hereinafter also referred to as "user environment identification information) for identifying the user environment UE.

As a result, the external information managing part 41 performs a data acquisition operation with respect to the external information 42D, based on the data format and the specifying of the storage destination of the DB managing the external information 42D that is the acquisition target specified from the user environment information.

Accordingly, the external information acquiring part 122 receives the corresponding external information from the external information managing part 41 in response to the request, and acquires the external information 42D depending on the user environment UE.

Next, the information generating part 12 merges the external information 42D and the internal information 22D that are acquired, according to a predetermined data format, by the acquired information merging part 123, and generates the information to be provided. In this state, in a case in which the information to be provided is a utilization status report of the equipment that is introduced in the user environment UE, for example, a data operation may be performed to arrange the acquired values into the data according to a template that forms the report. The acquired information merging part 123 may generate the information to be provided by merging the acquired values according to the predetermined data format.

The generated information output part 15 outputs the generated information that is to be provided. For example, the generated information output part 15 may be formed using an information display function of the browser or the like. More particularly, the browser may read the generated information to be provided (information generated by the information generating module M), and display the generated information to be provided on the browser. In this case, the generated information to be provided is data readable and displayable (that is, processable) by the browser.

Therefore, the information processing function in this embodiment is realized by the interaction or linked operation of the function parts described above. The information processing function in this embodiment may be realized by a program (software realizing the information processing function) that is installed in each equipment forming the information processing system 1. The program may be read from the storage unit (for example, "HDD", "ROM", etc.) and stored in a memory (for example, "RAM") by a processor (for example, "CPU"). The program which, when executed by the processor (or computer), causes the processor to perform the following processes in each equipment forming the information processing system 1 to realize the information processing function.

Figure 5:
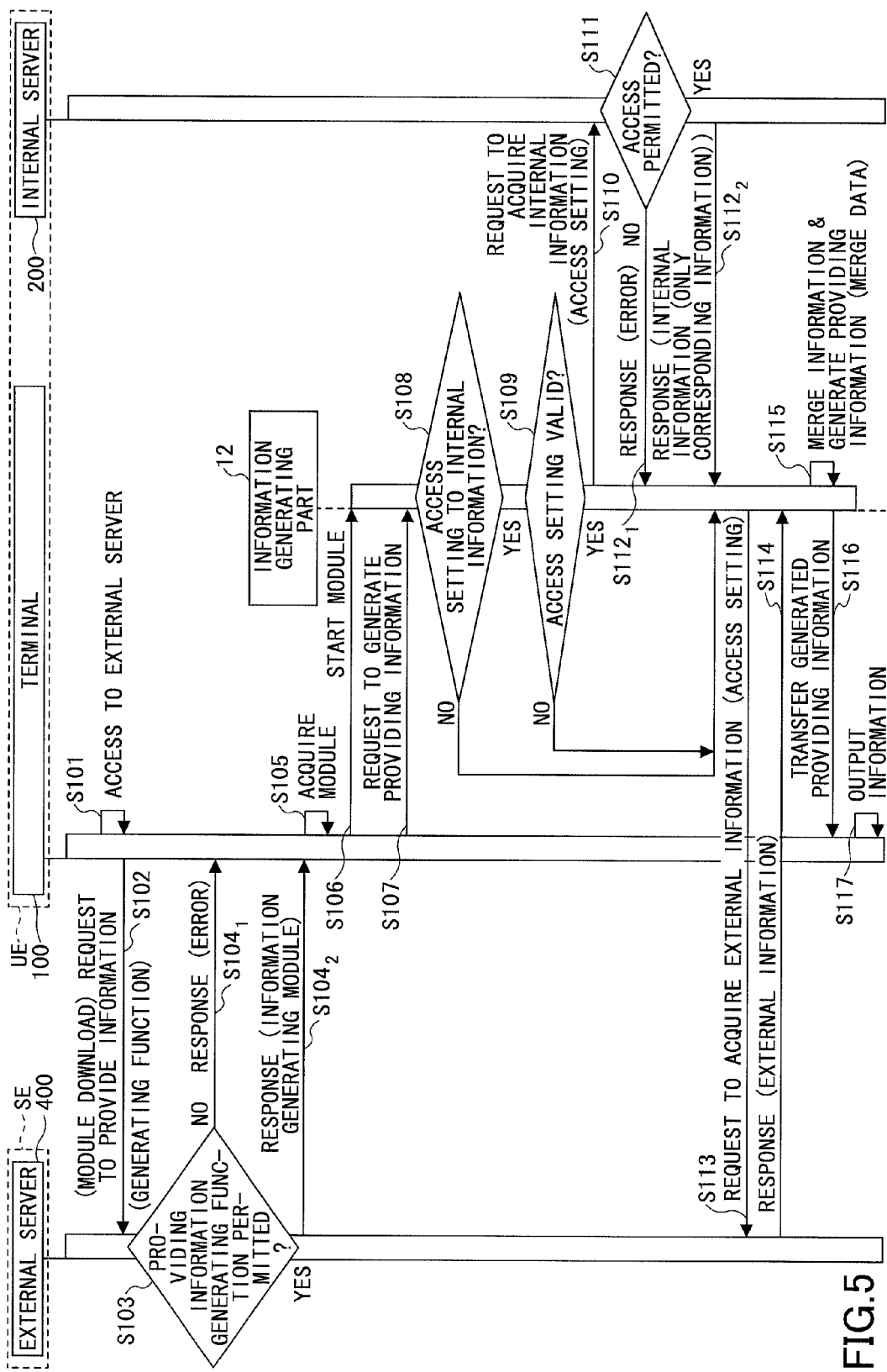
FIG. 5 is a sequence diagram illustrating an example of an information processing procedure in the first embodiment of the present invention.

A more detailed description will be given of the operation (interaction or linked operation of the function part group) of the information processing function, by referring to FIG. 5. FIG. 5 is a sequence diagram illustrating an example of the information processing procedure in the first embodiment of the present invention. FIG. 5 illustrates an example of the information processing procedure for a case in which an access to the external server 400 and an access to the internal server 200 are made via the browser that operates in the terminal 100.

As illustrated in FIG. 5, the terminal 100 makes an access to the external server 400 via the browser (step S101). In this state, the browser makes the access based on the URL of the external server 400.

The terminal 100 requests providing of the information generating function with respect to the external server 400 that is accessed, by the information generating function acquiring part 11 of the browser (step S102). In this state, the information generating function acquiring part 11 sends the user environment identification information to the external server 400, and requests downloading of the information generating module M.

When the external server 400 accepts the request from the terminal 100 to provide the information generating function, the external server 400 judges by the information generating function providing part 43 whether the user environment UE at the request source is a registered environment that is permitted as the providing destination for the information generating module M (step S103). In this state, the information generating function providing part 43 specifies the contract information of the user based on the user environment identification information that is received, and judges from the specified contract information whether the user environment UE a registered environment that is permitted as the providing destination for the information generating module M.

When it is judged that the user environment UE at the request source is not a registered environment that is permitted as the providing destination for the information generating module M (NO in step S103), the information generating function providing part 43 makes an error notification with respect to the terminal 100 (step S104$_1$). Hence, an error message is displayed on the browser of the terminal 100.

On the other hand, when it is judged that the user environment UE at the request source is a registered environment that is permitted as the providing destination for the information generating module M (YES in step S103), the information generating function providing part 43 provides the information generating module M with respect to the terminal 100 (step S104$_2$).

The terminal 100 downloads the information generating module M from the external server 400 via the browser, that is, receives the information generating function that is provided (step S105). Then, the terminal 100 starts the information generating module M on the browser (step S106). Hence, the information generating part 12 may function in the terminal 100.

The information generating part 12 of the terminal 100 accepts the request to generate the information to be provided (request to acquire internal information and external information necessary to generate the information to be provided) from the browser (step S107). Then, the information generating part 12 of the terminal 100 judges whether the access setting information 14D of the internal information 22D exists (step S108). In this state, the information generating part 12 requests acquisition of the access setting information 14D with respect to the access setting information managing part 13. As a result, the information generating part 12 judges that the access setting information 14D exists if the access setting information 14D acquirable from the access setting information retaining part 14 via the access setting information managing part 13.

When the information generating part 12 judges that the access setting information 14D exists (YES in step S108), the information generating part 12 judges whether the acquired access setting information 14D includes a valid setting (step S109). In this state, the information generating part 12 confirms whether the access setting information 14D is written in a predetermined data format that is determined in advance, in order to judge whether the setting is valid from a confirmation result.

When it is judged that the access setting information 14D is valid (YES in step S109), the information generating part 12 makes an access to the internal server 200 from the internal information acquiring part 121 based on the URL (item value of item "access destination data") of the acquired access setting information 14D that is valid, and requests acquisition of the internal information 22D (step S110). In this state, the internal information acquiring part 121 sends the acquired access setting information 14D that is valid to the internal server 200, and requests acquisition of the internal information 22D with respect to the internal information managing part 21 in the internal server 200.

As a result, when the internal server 200 accepts the acquisition request for the internal information 22D, the internal information managing part 21 judges whether the access to the internal information 22D is permitted, based on the authentication information (item value of item "access authentication data") of the received access setting information 14D (step S111).

When it is judged that the access to the internal information 22D is not permitted (NO in step S111), the internal information managing part 21 makes an error notification with respect to the terminal 100 (step S112$_1$). Hence, an error message is displayed on the browser of the terminal 100.

On the other hand, when it is judged that the access to the internal information 22D is permitted (YES in step S111), the internal information managing part 21 specifies the corresponding information (actual value) from the internal information retaining part 22, based on the data format of the DB that manages the internal information 22D that is the acquisition target and the specifying of the table and the column within the DB in which the internal information 22 that is the acquisition target is retained (item values of item "data format" and item "access destination conversion data"). As a result, the corresponding information that is specified is returned to the terminal 100 as a response (step S112$_2$). Consequently, in the terminal 100, the internal information acquiring part 121 of the information generating part 12 that functions on the browser acquires the internal information 22D.

When it is judged that the access setting information 14D does not exist (NO in step S108) or, when it is judge that the access setting information 14D is not valid (NO in step S109), no information acquiring process is performed by the internal information acquiring part 121.

Next, in the terminal 100, the external information acquiring part 122 of the information generating part 12 makes an access to the external server 400 based on the URL (item value of item "access destination data") of the access setting information in the external information 42D, and requests acquisition of the external information 42D (step S113). In this state, the external information acquiring part 122 sends the user environment identification information to the external server 400, and requests acquisition of the external information 42D with respect to the external information managing part 41 in the external server 400.

As a result, when the external server 400 receives the acquisition request for the external information 42D, the external information managing part 41 specifies the external information 42D to be acquired, based on the user environment identification information that is received, and specifies the corresponding information (actual value) from the external information retaining part 42 based on the specifying of the table and the column within the DB that retains the specified external information 42D. Hence, the corresponding information that is specified is sent from the external server 400 to the terminal 100 in a response (step S114). Thus, in the terminal 100, the external information 42D is acquired by the external information acquiring part 122 of the information generating part 12 that functions on the browser.

Next, in the terminal 100, the acquired information merging part 123 of the information generating part 12 merges the external information 42D and the internal information 22D that are acquired, according to a predetermined data format, in order to generate the information that is to be provided (step S115).

The merging process to merge the external information 42D and the internal information 22D is performed when the internal information 22D is acquired.

The information generating part 12 transfers the generated information that is to be provided to the browser at the request source (step S116). As a result, when the browser at the request source receives the information to be provided, the generating information output part 15 displays the information to be provided (step S117).

Therefore, according to the information processing system in this embodiment, the information generating module M downloaded (or acquired) from the external server 400 is executed in the user environment UE, and the generation of the information to be provided, including the internal information 22D, is performed solely within the user environment UE.

Second Embodiment

Figure 6:
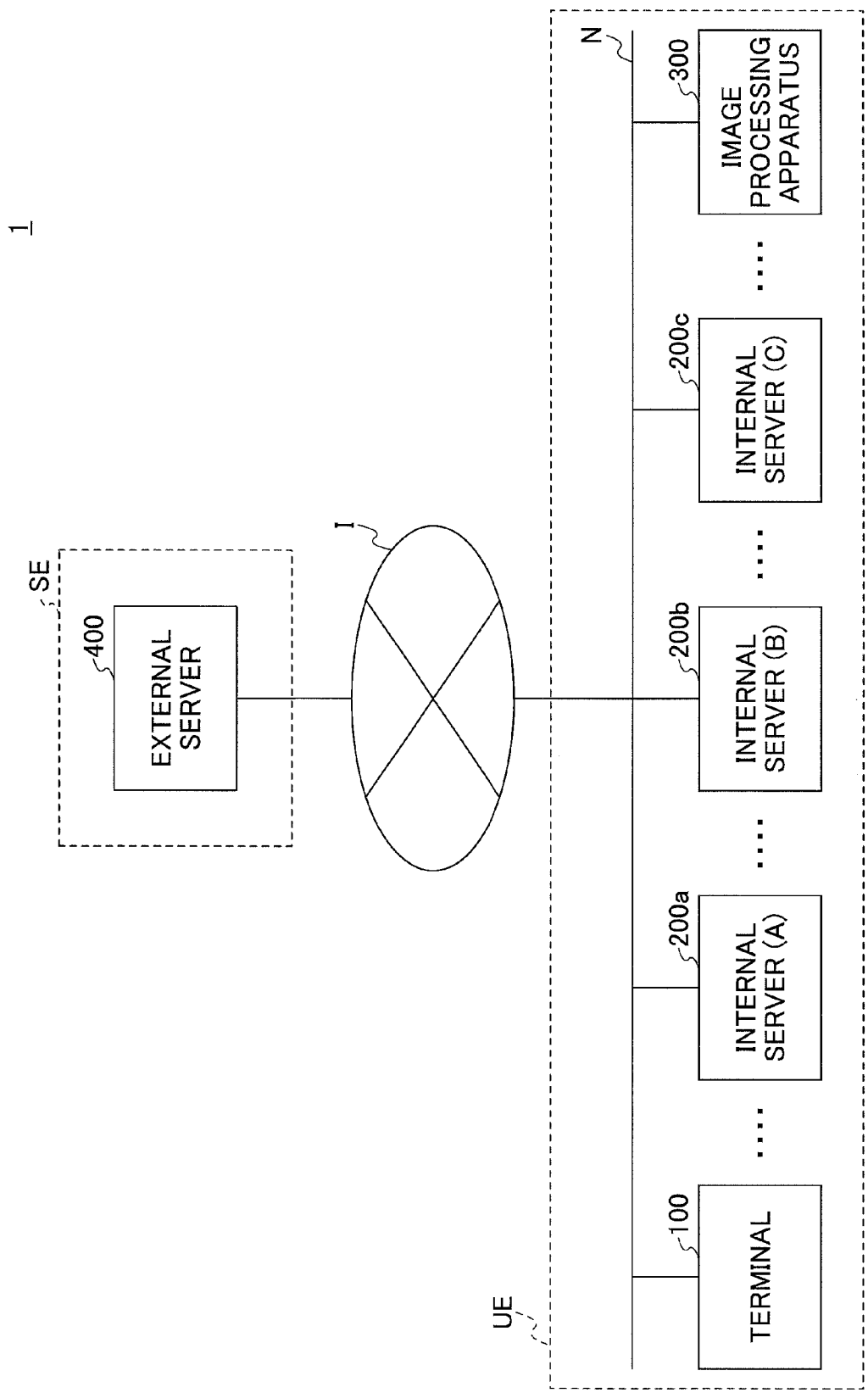
FIG. 6 is a block diagram illustrating an example of a structure of the information processing system in a second embodiment of the present invention.

FIG. 6 is a block diagram illustrating an example of a structure of the information processing system in a second embodiment of the present invention. In FIG. 6, those parts that are the same as those corresponding parts in FIG. 1 are designated by the same reference numerals, and a description thereof will be omitted.

FIG. 6 illustrates an example of the structure in which the user environment UE includes three internal servers 200a, 200b, and 200c (that is, internal servers A, B, and C). In other words, the user environment UE of the information processing system 1 may include a plurality of internal servers 200. In this case, the terminal 100 must switch the internal server 200 that is to become the information acquiring destination, depending on the internal information 22D included in the information to be provided. In addition, in a case in which the information to be provided includes a plurality of kinds of internal information 22D, the information acquisition must be made from the plurality of internal servers 200.

Figure 7:
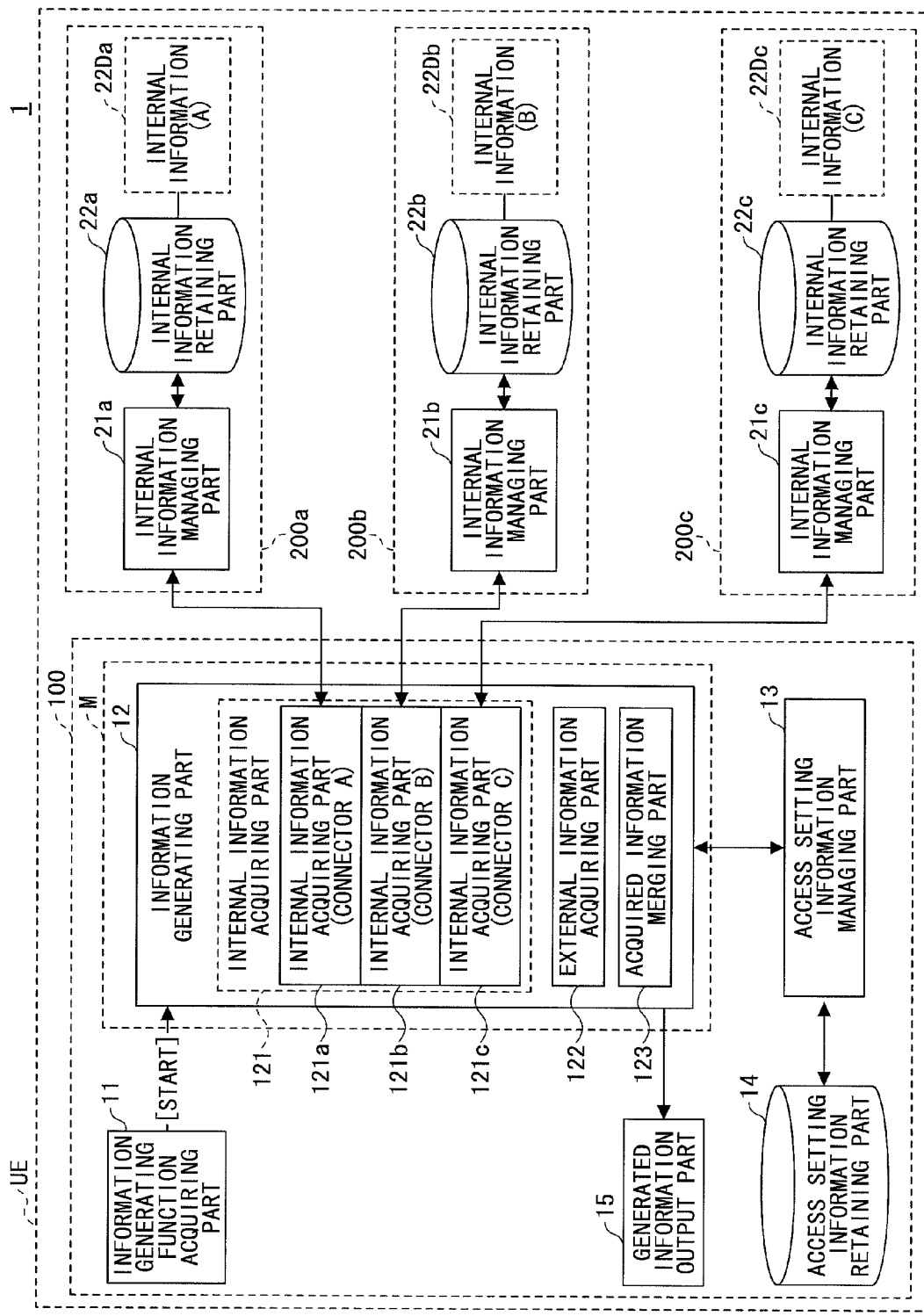
FIG. 7 is a diagram illustrating an example of a functional structure of the information processing system (or user environment) in the second embodiment of the present invention.

Hence, this embodiment employs a functional structure illustrated in FIG. 7. FIG. 7 is a diagram illustrating an example of the functional structure of the information processing system (or user environment) in the second embodiment of the present invention. In FIG. 7, those parts that are the same as those corresponding parts in FIG. 3 are designated by the same reference numerals, and a description thereof will be omitted.

In the information processing system 1 illustrated in FIG. 7, the information generating part 12 that functions in the terminal 100 includes internal information acquiring parts 121a, 121b, and 121c (or connectors A, B, and C) corresponding to the internal servers 200a, 200b, and 200c (or internal servers A, B, and C) in the user environment UE. In other words, the internal information acquiring part 121 corresponding to each internal server 200 is formed into parts, based on the structure of the internal server 200 in the user environment UE, and these software parts (internal information acquiring modules) are included in the information generating module M.

By forming the internal information acquiring part 121 into the parts, the party (for example, a vendor such as the manufacturer) who provides the information generating module M may easily create the information generating module M corresponding to the internal server configuration in the user environment UE. For this reason, the party who provides the information generating module M may quickly provide to the user the information generating module M appropriate for the user environment UE.

According to the information processing system 1 in this embodiment, the external server 400 manages the information generating module M that is created depending on the internal server configuration in the user environment UE, based on the contract information of the user. The terminal 100 sends the user environment identification information from the information generating function acquiring part 11 to the external server 400, and requests downloading (or acquisition) of the information generating module M for the user environment UE.

As a result, the external server 400 sends the corresponding information generating module M from the information generating function providing part 43 to the terminal 100, based on the user environment identification information that is received. The terminal 100 starts the information generating module M that is acquired, and in order to activate the function of the information generating part 12 including the plurality of internal information acquiring parts 212 corresponding to the internal servers 200.

Hence, in the terminal 100, the information generating part 12 selects the internal information acquiring part 121 that is to perform the information acquiring process, based on the internal information 22D (information necessary to generate the information to be provided) included in the information to be provided. In other words, the information generating part 12 controls the internal information acquiring part 121 (or connector) that is to be used, when acquiring from the internal server 200 the internal information 22D included in the information to be provided.

Figure 8:
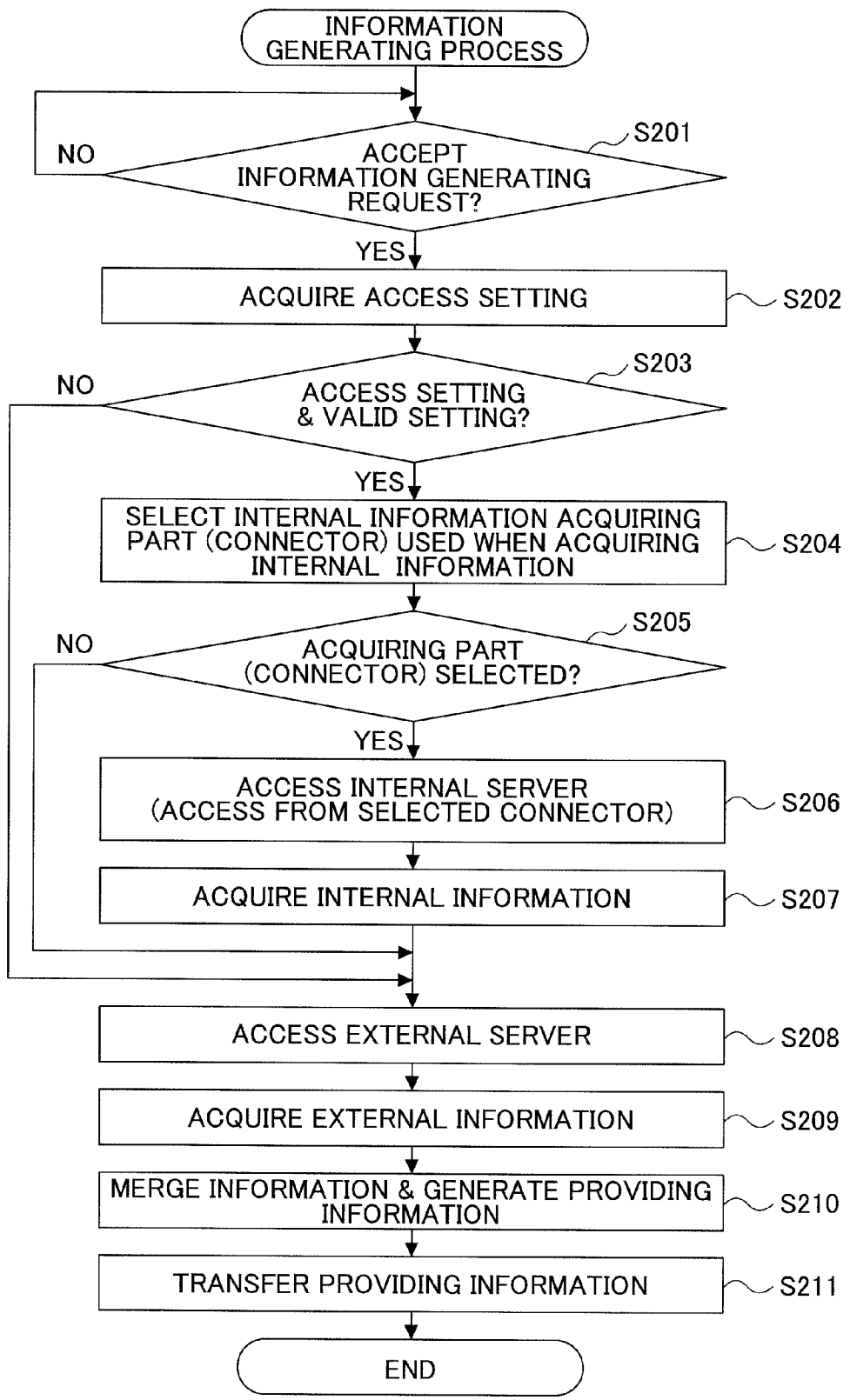
FIG. 8 is a flow chart for explaining an example of a processing procedure of information generation in the second embodiment of the present invention.

Next, a more detailed description will be given of the operation (interaction or linked operation of function part group) of the processing function of the information generation, by referring to FIG. 8. FIG. 8 is a flow chart for explaining an example of a processing procedure of information generation in the second embodiment of the present invention. The process of steps S201 through S203 and steps S208 through S211 in FIG. 8 are the same as the process of the steps S108 through S116 illustrated in FIG. 5. Hence, a description will only be given with respect to the process (internal information acquiring process) of steps S204 through S207.

As illustrated in FIG. 8, when the information generating part 12 judges that the access setting information 14D managed by the access setting information managing part 13 is valid (YES in step S203), the information generating part 12 selects the internal information acquiring part 121 to be used for the information acquisition from the plurality of internal information acquiring parts 121 corresponding to the internal servers 200 (step S204). In this state, the information generating part 12 specifies the internal server 200 that manages the information, based on the internal information 22D included in the information to be provided, and selects the internal information acquiring part 121 corresponding to the specified internal server 200.

When the information generating part 12 is able to select the internal information acquiring part 121 that is to acquire the internal information 22D included in the information to be provided (YES in step S205), the selected internal information acquiring part 121 makes an access to the corresponding internal server 200 based on the access setting information 14D (step S206). In addition, the selected internal information acquiring part 121 acquires the internal information 22D via the internal information managing part 21 (step S207). When a plurality of internal information acquiring parts 121 are selected, the information generating part 12 acquires the internal information 22D from the corresponding plurality of internal servers 200 using each of the plurality of selected internal information acquiring parts 121. Further, when acquiring the information from the plurality of internal servers 200, the information acquiring processes may be performed in parallel in order to reduce the processing time.

On the other hand, when the internal information acquiring part 121 cannot be selected (NO in step S205), the information acquiring process of the internal information acquiring part 121 is not performed, and the process advances to the process of acquiring the external information (step S208).

In this example, the user environment UE includes a plurality of internal servers 200, and the terminal 100 controls the switching of the information acquiring process from the plurality of internal servers 200. However, the user environment UE may manage a plurality of kinds of internal information 22D using a single internal server 200, for example.

Third Embodiment

Figure 9:
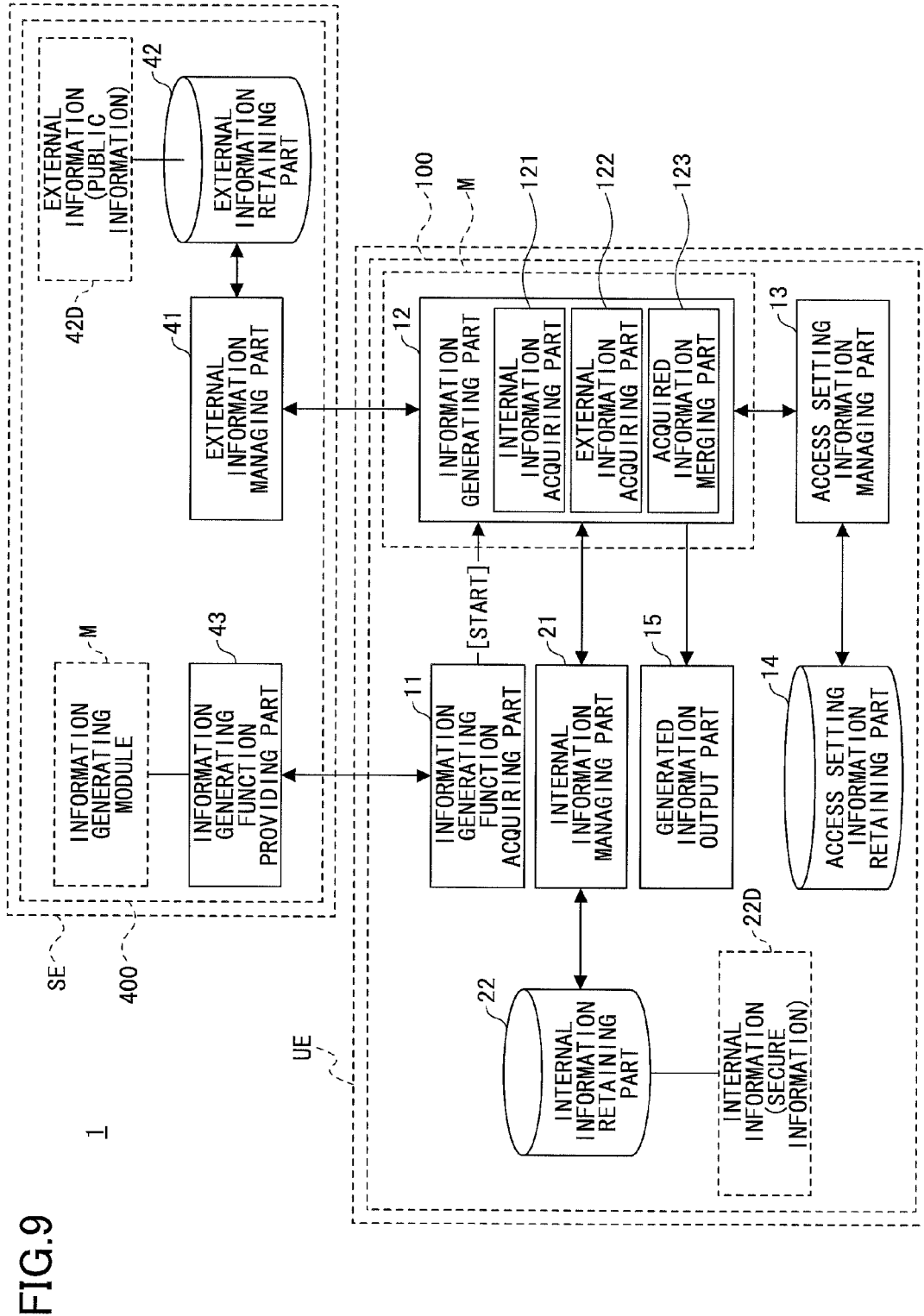
FIG. 9 is a block diagram illustrating an example of a functional structure of the information processing system in the second embodiment of the present invention.

FIG. 9 is a block diagram illustrating an example of a functional structure of the information processing system in the second embodiment of the present invention. In FIG. 9, those parts that are the same as those corresponding parts in FIG. 3 are designated by the same reference numerals, and a description thereof will be omitted.

In the embodiments described above, the user environment UE includes the internal server 200 that manages the internal information 22D and the terminal 100 that outputs the information to be provided. However, the functional structure of the information processing system 1 is not limited to such a functional structure.

FIG. 9 illustrates an example in which the terminal 100 includes the internal information managing part 21, and the terminal 100 manages the internal information 22D retained therein. According to this functional structure of the information processing system 1, information generating part 12 of the terminal 100 may generate the information to be provided, using the external information 42D acquired from the external server 400 and the internal information 33D managed within the terminal 100. Hence, in the information processing system 1, the user environment UE may include the terminal 100 that manages the internal information 22D and outputs the information to be provided.

<Summary>

According to the information processing system 1 in each embodiment described above, the terminal 100 connected to the internal network N downloads (or acquires) the information generating module M (software realizing the information generating function) from the external server 400, and executes the acquired information generating module M. As a result, the information generating part 12 of the terminal 100 functions and is activated to perform the following process.

That is, the internal information acquiring part 121 of the terminal 100 makes an access to the internal server 200 that retains the internal information 22D, based on the access setting information 14D of the internal information 22D, and acquires the internal information 22D. Then, the external information acquiring part 122 of the terminal makes an access to the external server 400 that retains the external information 42D, and acquires the external information 42D. In addition, the acquired information merging part 123 of the terminal 100 merges the external information 42D and the internal information 22D that are acquired, according to a predetermine data format, and generates the information to be provided.

Accordingly, in the information processing system 1 in each embodiment described above, it is possible to output the information to be provided, using the external information 42D and the internal information 22D, without requiring the external server 400 to collect the internal information 22D of the user environment UE. In other words, in the information processing system 1, the security of the internal information 22D may be achieved in the user environment UE when providing the information to be provided.

In each embodiment described above, the "information processing function" may be realized by executing a program that is written in a programming language or code suited for the operating environment (or platform) and is installed in each equipment forming the information processing system 1. The program may be read from the storage unit and stored in a memory. The program which, when executed by the processor (or computer), causes the processor to perform the above described procedures of the processes in each equipment forming the information processing system 1 to realize the information processing function.

For example, in the case of the terminal 100, the program may be stored in the recording medium 103a forming a computer-readable storage medium. Hence, this program may be installed into the terminal 100 via the drive unit 103. In addition, because the terminal 100 includes the interface unit 107, this program may be downloaded via a communication line (or network) and installed into the terminal 100.

Of course, the embodiments may be appropriately combined if necessary.

In this specification, the consecutive numbers, such as "first" and "second", assigned to the embodiments and modifications thereof do not represent priorities of the embodiments and modifications.

Further, the present invention is not limited to these embodiments, but various variations and modifications may be made without departing from the scope of the present invention.

What is claimed is:

1. An information processing system comprising:
   an external system comprising a first information processing apparatus configured to manage public external information retained in a first storage region within the external system, and provide a software service; and
   an internal system, coupled to the external system via a data channel, and comprising a second information processing apparatus configured to manage secure internal information retained in a second storage region within the internal system, and a third information processing apparatus configured to output information to be provided by the software service,
   wherein the first information processing apparatus comprises:
      a providing unit configured to send, to an acquisition request source, an information generating module for generating the information to be provided, and provide an information generating function, and
   wherein the third information processing apparatus comprises:
      a first acquiring unit configured to receive the information generating module and acquire the information generating function; and
      a generating unit configured to generate the information to be provided, by executing the information generating module, using the public external information acquired from the first information processing apparatus and the secure internal information acquired from the second information processing apparatus.

2. The information processing system as claimed in claim 1, wherein the providing unit sends the information generating module to the acquisition request source to which providing of the information generating function is permitted.

3. The information processing system as claimed in claim 1, wherein the third information processing apparatus further comprises:
   a retaining unit configured to retain access setting information, related to an access setting for making access to the secure internal information managed in the second information processing apparatus, in a third storage region within the internal system,
   wherein the generating unit comprises:
      a second acquiring unit configured to acquire the secure internal information from the second information processing apparatus based on the access setting information, and
   wherein the generating unit acquires, from the retaining unit, the access setting information corresponding to the secure internal information that is an acquisition target, based on the access setting information that is acquired, and acquires the secure internal information from the second information processing apparatus by the second acquiring unit.

4. The information processing system as claimed in claim 3, wherein the generating unit judges whether the access setting information acquired from the retaining unit is valid, based on a predetermined data format, and acquires the secure internal information from the second information processing apparatus by the second acquiring unit, based on the access setting information that is judged as being valid.

5. The information processing system as claimed in claim 3, wherein the second acquiring unit makes an access to the secure internal information managed in the second information processing apparatus and acquires the secure internal information to which the access is permitted, based on authentication information set in the access setting information.

6. The information processing system as claimed in claim 3, wherein the second acquiring unit acquires the secure internal information that is the acquisition target from the second information processing apparatus, based on storage destination information retaining the secure internal information that is the acquisition target set in the access setting information.

7. The information processing system as claimed in claim 1, wherein the providing unit sends, to the acquisition request source, the information generating module including a plurality of internal information acquiring modules corresponding to the secure internal information that is the acquisition target, and
   wherein the generating unit comprises a plurality of second acquiring units, and executes the internal information acquiring modules to select the second acquiring unit that is to be used when acquiring the secure internal information including the information to be provided from the plurality of second acquiring units, and acquire the secure internal information from the second information processing apparatus by the selected second acquiring unit.

8. The information processing system as claimed in claim 1, wherein the generating unit generates the information to be provided by merging the public external information and the secure internal information according to a predetermined data format.

9. The information processing system as claimed in claim 1, wherein the first storage region is provided within the first information processing apparatus, and the second storage region is provided within the second information processing apparatus.

10. The information processing system as claimed in claim 3, wherein the first storage region is provided within the first information processing apparatus, the second storage region is provided within the second information processing apparatus, and the third storage region is provided within the third information processing apparatus.

11. A system comprising:
   a second information processing apparatus configured to manage secure internal information retained in a second storage region thereof; and
   a third information processing apparatus communicable with an external, first information processing apparatus that stores and manages public external information therein and provides a software service, and configured to output information to be provided by the software service,
   wherein the third information processing apparatus comprises:
      a first acquiring unit configured to receive, from the first information processing apparatus, an information generating module for generating information to be provided, and acquire an information generating function from the first information processing apparatus; and
      a generating unit configured to generate the information to be provided, by executing the information generating module, using the public external information acquired from the first information processing apparatus and the secure internal information acquired from the second information processing apparatus.

12. The system as claimed in claim 11, wherein the third information processing apparatus further comprises:
- a retaining unit configured to retain access setting information, related to an access setting for making access to the secure internal information managed in the second information processing apparatus, in a third storage region of the third information processing apparatus,
- wherein the generating unit comprises:
  - a second acquiring unit configured to acquire the secure internal information from the second information processing apparatus based on the access setting information, and
- wherein the generating unit acquires, from the retaining unit, the access setting information corresponding to the secure internal information that is an acquisition target, based on the access setting information that is acquired, and acquires the secure internal information from the second information processing apparatus by the second acquiring unit.

13. The system as claimed in claim 12, wherein the generating unit judges whether the access setting information acquired from the retaining unit is valid, based on a predetermined data format, and acquires the secure internal information from the second information processing apparatus by the second acquiring unit, based on the access setting information that is judged as being valid.

14. The system as claimed in claim 12, wherein the second acquiring unit makes an access to the secure internal information managed in the second information processing apparatus and acquires the secure internal information to which the access is permitted, based on authentication information set in the access setting information.

15. The system as claimed in claim 12, wherein the second acquiring unit acquires the secure internal information that is the acquisition target from the second information processing apparatus, based on storage destination information retaining the secure internal information that is the acquisition target set in the access setting information.

16. The system as claimed in claim 11, wherein the first acquiring unit receives from the first information processing apparatus, the information generating module including a plurality of internal information acquiring modules corresponding to the secure internal information that is an acquisition target, and
- wherein the generating unit comprises a plurality of second acquiring units, and executes the internal information acquiring modules to select the second acquiring unit that is to be used when acquiring the secure internal information including the information to be provided from the plurality of second acquiring units, and acquire the secure internal information from the second information processing apparatus by the selected second acquiring unit.

* * * * *